United States Patent [19]

Pavlin

[11] Patent Number: 5,645,632
[45] Date of Patent: Jul. 8, 1997

[54] DIESTERS OF POLYMERIZED FATTY ACIDS USEFUL IN FORMULATING HOT-MELT INKS

[75] Inventor: Mark S. Pavlin, Lawrenceville, N.J.

[73] Assignee: Union Camp Corporation, Wayne, N.J.

[21] Appl. No.: 601,208

[22] Filed: Feb. 14, 1996

[51] Int. Cl.⁶ ................................. C09D 11/02
[52] U.S. Cl. .................. 106/31.29; 106/31.61; 554/121; 347/100
[58] Field of Search ............... 106/27 R, 23 A, 106/22 A; 554/121

[56] References Cited

U.S. PATENT DOCUMENTS

| | | | |
|---|---|---|---|
| 3,156,572 | 11/1964 | Carlick et al. | 106/27 R |
| 3,653,932 | 4/1972 | Berry et al. | 106/22 |
| 3,715,219 | 2/1973 | Kurz et al. | 106/22 |
| 3,769,215 | 10/1973 | Sturwold et al. | 252/19.5 |
| 4,157,990 | 6/1979 | Lindner et al. | 252/56 S |
| 4,390,369 | 6/1983 | Merritt et al. | 106/31 |
| 4,400,215 | 8/1983 | Cooke et al. | 106/22 |
| 4,484,948 | 11/1984 | Merritt et al. | 106/31 |
| 4,655,836 | 4/1987 | Drawert et al. | 106/27 R |
| 4,659,383 | 4/1987 | Lin et al. | 106/27 |
| 4,668,765 | 5/1987 | Drawert et al. | 106/27 R |
| 4,738,889 | 4/1988 | Suzuki et al. | 106/31 A |
| 4,820,346 | 4/1989 | Nowak | 106/22 |
| 4,830,671 | 5/1989 | Frihart et al. | 106/27 |
| 5,011,629 | 4/1991 | Bilbo | 260/405 |
| 5,104,586 | 4/1992 | Brand et al. | 514/785 |
| 5,122,187 | 6/1992 | Schwarz et al. | 106/25 |
| 5,141,559 | 8/1992 | Shinozuka et al. | 106/27 |
| 5,151,120 | 9/1992 | You et al. | 106/27 |
| 5,286,288 | 2/1994 | Tobias et al. | 106/20 B |
| 5,350,446 | 9/1994 | Lin et al. | 706/27 R |
| 5,354,368 | 10/1994 | Larson, Jr. | 106/22 A |
| 5,397,388 | 3/1995 | Fujioka | 106/28 A |

FOREIGN PATENT DOCUMENTS

| | | |
|---|---|---|
| 367979 A | 5/1990 | European Pat. Off. . |
| 4110836 A | 10/1992 | Germany . |
| 1-110527 A | 4/1989 | Japan . |
| 909363 | 10/1962 | United Kingdom . |
| WO86/00300 | 1/1986 | WIPO . |

*Primary Examiner*—Helene Klemanski
*Attorney, Agent, or Firm*—Seed and Berry LLP

[57] ABSTRACT

Solid diesters for hot-melt inks are prepared by reaction of polymerized fatty acid with long chain primary monohydric alcohols, optionally in the presence of diamine. The long chain alcohols have at least about 20 carbon atoms, and preferably have 24 or more carbon atoms. The esterification of liquid polymerized fatty acid with monohydric alcohol provides a diester that is solid at room temperature and has a melting point of less than about 150° C. The diester can be formulated with colorants and/or other image-producing materials to provide an ink for hot-melt printing, e.g., hot-melt ink jet, gravure or intaglio printing.

25 Claims, No Drawings

DIESTERS OF POLYMERIZED FATTY ACIDS USEFUL IN FORMULATING HOT-MELT INKS

TECHNICAL FIELD

The present invention relates to hot-melt inks and components thereof, as well as methods for printing with such inks.

BACKGROUND OF THE INVENTION

Hot-melt inks are characterized as being solid at room temperature and molten at an elevated temperature at which the hot-melt ink is applied to a substrate. Hot-melt inks are in widespread use in ink jet printers, and have also been suggested for use in intaglio and gravure printing.

Ink jet printing is a well-known process for non-contact printing of substrates such as paper, plastic films, metal foils and the like. In general, ink jet printing ejects a stream of liquid ink through a very small orifice, and thereafter, at a certain distance from the orifice known as the breakup distance, the stream separates into minute uniformly-sized droplets. The ink droplets travel through the air until they hit a substrate, whereupon the ink forms an image on the substrate.

Various technologies have been developed to direct jet ink in an image-wise fashion from a printhead of a printing device to a substrate. In one technology, called drop-on-demand, a printhead passes over a substrate and ejects droplets of ink only when and where ink is desirably deposited on the substrate. Drop-on-demand technology is commonly employed in desktop ink jet printers.

In contrast, in a process known as continuous stream jet printing, the printhead is constantly ejecting ink droplets as it passes over a substrate, or as the substrate passes before the printhead. A guidance system is stationed between the printhead and the substrate, so the ink droplets are directed either to a specific location on the substrate or to a recirculation gutter if the droplets being ejected should not be allowed to contact the substrate. A typical continuous stream ink jet printer employs inks that can be given an electric charge, and the guidance system is an electrostatic field that will interact with and direct the charged ink droplets to a desired location. Continuous stream jet ink printing is more commonly seen in industrial printing than in desk top printing.

Jet inks suitable for either drop-on-demand or continuous stream ink jet printing can be classified as either liquid jet inks or hot-melt jet inks. Either type of ink typically contains both colorant and carrier, where the carrier is some material which dissolves or suspends the colorant. A liquid jet ink is liquid at room temperature, and is typically at about room temperature when it is stored in a printhead prior to being ejected. A simple liquid jet ink is composed of an aqueous carrier and a water-soluble dye as the colorant. After a liquid jet ink contacts a substrate, the solvent typically evaporates or wicks away from the colorant, leaving the colorant to be visible at the site where the ink initially contacted the substrate.

In contrast, a hot-melt jet ink is solid at room temperature, and is heated to a molten state prior to being ejected from an ink jet printhead. Upon contacting the substrate, which is typically at room temperature, the molten hot-melt ink will cool and solidify. A simple hot-melt ink is composed of wax as the carrier and a pigment or dye as the colorant. All or nearly all of the components of a hot-melt ink remain at the site where the molten ink contacts the substrate, i.e., there is little or no wicking or evaporation of a hot-melt ink.

Ink compositions which are used in jet ink printing should have certain properties. It is highly desirable that the ink compositions display a consistent breakup length, droplet viscosity, and at least in continuous stream jet printing, a constant droplet charge under the specific set of conditions employed during the jet ink printing process. To meet these requirements, the jet ink composition must have stable viscosity and resistance properties, and should not dry out upon aging.

One of the major problems encountered with liquid jet inks is due to their containing substantial amounts of water and/or organic solvent, which evaporate upon standing so that these ink compositions dry out and cake. This causes blocking of the printhead orifice(s). A further problem is that loss of volatile solvents causes the inks to increase in viscosity, which will cause substantial changes in the performance of the inks. Also, a porous substrate such as paper tends to cockle and/or distort when printed with high quantities of liquid jet ink. Additionally, organic solvents present in a liquid jet ink can evaporate after contacting the substrate, and this may cause health problems for some persons nearby.

Another problem associated with the presence of volatile solvents in a liquid jet ink is that the solvents cause the colorant to bleed into the printed substrate, which is typically porous, with the consequence that the printing displays poor resolution. While specially coated porous substrates may overcome this problem, such special substrates are expensive and not generally necessary for other types of printing, e.g., reprographic printing, which work fine on "plain paper", i.e., standard non-coated sheet. At least in an office setting, it is highly desirable that all printing, including ink jet printing, be done on "plain paper" or standard transparencies.

Hot-melt inks offer a number of advantages over liquid inks. For example, when liquid ink is used to deposit colorant on a porous substrate, the colorant tends to be carried into the substrate as the liquid carrier wicks into the substrate. This causes a reduction in print density and some loss in print resolution. However, the rapid solidification of a hot-melt ink provides for the colorant to be fixed at the surface of the substrate, with a corresponding increase in print density and resolution. A further advantage is that there is little or no cockle associated with the printing of hot-melt inks, which is in distinct contrast to the situation where liquid inks are printed. Still another advantage is that hot-melt inks are easier to transport without spillage than are liquid inks.

For several reasons, the adhesion of colorant to a substrate may also be superior in hot-melt printing. For instance, because all of the carrier in a hot-melt ink stays with the colorant at the surface of the printed substrate, rather than evaporating or wicking away from the colorant as occurs in printing with liquid inks, a hot-melt carrier is more available to assist in fixing the colorant to the substrate surface. Also, carriers which are solid at room temperature will naturally have better fixing properties than liquid carriers.

Looking specifically at jet ink printing, hot-melt inks offer the advantage of having essentially no volatile components. Thus, there is no evaporation of components in a hot-melt ink, and so no corresponding problems with changes in ink viscosity, caking and health risks due to solvent evaporation, which are seen with liquid jet inks.

To a significant extent, the properties of the carrier determine the properties of a jet ink. The prior art discloses several materials that may be used as a carrier, sometimes called a vehicle, a binder or a solid organic solvent, in hot-melt jet inks. U.S. Pat. No. 3,653,932 discloses to use diesters of sebacic acid (a solid linear $C_{10}$ dicarboxylic acid) and paraffinic alcohols having 12 or less carbons. U.S. Pat. No. 4,390,369 discloses to use natural wax. U.S. Pat. No. 4,659,383 discloses to use $C_{20-24}$ acids or alcohols. U.S. Pat. No. 4,820,346 discloses to use aromatic sulfonamides. U.S. Pat. No. 4,830,671 discloses to use short-chain polyamides. U.S. Pat. No. 5,151,120 discloses to use the ethyl ester of stearic acid (a solid linear, $C_{18}$ carboxylic acid). U.S. Pat. No. 5,354,368 discloses to use tall oil rosin. The foregoing are exemplary of the prior art directed to hot-melt ink carriers.

British Patent 909,363 discloses to prepare ester waxes from mixtures of solid aliphatic mono- and dicarboxylic acids (prepared by oxidation of paraffin and/or montan wax) reacted with solid aliphatic wax alcohols (obtained by oxidation of natural or synthetic hydrocarbons having a solidification point above 70° C.). The wax esters are reportedly useful in floor polishes.

PCT International Publication No. WO 86/00300 discloses high molecular weight esters prepared by reacting primary branched alcohols having a minimum of 28 carbon atoms with polymeric fatty acids. The esters are liquid at room temperature, and thus unsuited for hot-melt inks, but are reportedly useful as lubricants, release agents, plasticizers, solvents or a modifier additive for such compositions.

Despite the significant amount of research that has been done in the area of carriers for hot-melt inks, there remains a need in the art for superior carrier materials useful in hot-melt inks, and for inks having such carrier materials.

SUMMARY OF THE INVENTION

The invention is directed to a solid diester prepared by reacting about 2 equivalents of liquid polymerized fatty acid with about x equivalents of $C_{20+}$ monohydric linear alcohol and about y equivalents of diamine, where x+y is equal to about 2, and y is 0 to about 1.

The invention is also directed to a process for preparing a solid diester wherein about 2 equivalents of liquid polymerized fatty acid are reacted with about x equivalents of $C_{20+}$ monohydric linear primary alcohol and about y equivalents of diamine, where x+y is equal to about 2 and y is 0 to about 1.

Another aspect of the invention is directed to a hot-melt ink composition comprising an image-forming component and a solid diester as described above.

Yet another aspect of the invention is a method of jet printing comprising the steps of mixing an image-forming component with the solid diester as described above, to thereby prepare a hot-melt ink, melting said hot-melt ink within a printhead designed for hot-melt printing, and ejecting molten hot-melt ink from said printhead onto a substrate.

A further aspect of the invention is a method of gravure and intaglio printing comprising the steps of mixing an image-forming component with the solid diester as described above to thereby prepare a hot-melt ink, melting the hot-melt ink to prepare molten ink, contacting a gravure or intaglio printing plate with the molten ink to provide a printing plate having molten ink thereon, and then contacting the printing plate having molten ink thereon with a substrate to transfer an image from the printing plate to the substrate.

DETAILED DESCRIPTION OF THE INVENTION

The invention is directed to solid diesters useful as components of hot-melt inks, and particularly hot-melt inks for ink jet, intaglio and gravure printing. The diesters are prepared by esterification of liquid polymerized fatty acid, which is primarily a dicarboxylic acid (also known as a diacid), with a long chain linear monohydric alcohol, optionally in the presence of diamine. The reaction of such a dicarboxylic acid and monohydric alcohol provides a diester that is solid at room temperature and has a melting point of less than about 150° C. The diester can be formulated with colorants and/or other image-forming components to provide an ink for hot-melt printing.

Polymerized fatty acid as used to form the solid diester of the invention is a well known and venerable material of commerce, and thus need not be described in great detail. Polymerized fatty acid is typically formed by heating long-chain unsaturated fatty acids, e.g., $C_{18}$ monocarboxylic acids, to about 200°–250° C. in the presence of a clay catalyst in order that the fatty acids polymerize. The product typically comprises dimer acid, i.e. $C_{36}$ dicarboxylic acid formed by dimerization of the fatty acid, and trimer acid, i.e., $C_{54}$ tricarboxylic acid formed by trimerization of the fatty acid. Polymerized fatty acid is typically a mixture of structures, where individual dimer acids may be saturated, unsaturated, cyclic, acyclic, etc. A more detailed discussion of fatty acid polymerization may be found in, e.g., U.S. Pat. No. 3,157,681 and *Naval Stores—Production, Chemistry and Utilization*, D. F. Zinkel and J. Russel (eds.), Pulp. Chem. Assoc. Inc., 1989, Chapter 23.

Because fatty acid polymerization typically forms much more dimer acid than trimer acid, those skilled in the art may often refer to polymerized fatty acid as dimer acid, even though some trimer acid, and even higher polymerization products, may be present with the dimer acid. It is preferred that the polymerized fatty acid contain less than about 10 weight percent of trimer acid, based on the total weight of the polymerized fatty acid, and that the dimer acid constitute at least about 90 weight percent of the polymerized fatty acid. More preferably, the dimer acid constitutes essentially all of the polymerized fatty acid.

Typical unsaturated fatty acids used to form polymerized fatty acid include oleic acid, linoleic acid, linolenic acid, etc. Tall oil fatty acid, which is a mixture containing long-chain unsaturated fatty acids obtained as a byproduct of the wood pulping process, are preferred for preparing polymerized fatty acid useful in the invention. While tall oil fatty acid is a preferred source of long-chain fatty acid, the polymerized fatty acid may alternatively be prepared by polymerization of unsaturated fatty acids from other sources, e.g., soybeans or canola.

Tall oil fatty acid typically contains some amount of resin acids, and thus the polymerization of tall oil fatty acid may form dimer acid in combination with impurities such as resin acid, dimerized resin acid and decarboxylated resin acid. These impurities may be present in the polymerized fatty acid useful in the invention. The acid number of a typical polymerized fatty acid useful in the invention is on the order of about 180 to about 200.

The polymerized fatty acid useful in the invention is a liquid, even though some components thereof, e.g., trimer acid and/or resin acid dimer, may be solid or semi-solid. However, the combination of dimer acid and any components present therewith is a liquid at 25° C.

The polymerized fatty acid of the invention may be hydrogenated prior to its esterification reaction, or the product of the esterification reaction may be hydrogenated. In either event, hydrogenation tends to provide for a slightly higher melting point for the diester, as well as imbue the diester with somewhat greater oxidative stability.

Polymerized fatty acid, dimer acid, and hydrogenated versions thereof may be obtained from a number of commercial suppliers. For example, Union Camp Corporation (Wayne, N.J.) sells polymerized fatty acid under their UNIDYME® trademark.

The diester of the invention is the reaction product of a polymerized fatty acid generally as described above, and a long-chain linear monohydric alcohol. Long chain alcohols useful in the invention have at least 20 carbon atoms, and can have 30, 40 or even more carbon atoms, although typically they do not have more than about 60 carbon atoms. The designation $C_{20+}$ is used herein to mean that there are at least 20 carbon atoms, and optionally more than 20 carbon atoms, in the monohydric alcohol useful in the invention.

The $C_{20+}$ monohydric alcohols useful in the invention are solid at 25° C. Preferably, the $C_{20+}$ monohydric alcohol is a primary saturated linear alcohol with a molecular formula $C_nH_{2n+2}O$, where n is at least 20.

The $C_{20+}$ monohydric alcohol is selected so that the diester formed therefrom is a solid having a melting point at least about 40° C., preferably at least about 50° C., and more preferably at least about 60° C. In addition, the monohydric alcohol is selected so that the melting point of the diester prepared therefrom is less than about 150° C., preferably less than about 140° C., and more preferably less than about 130° C.

A suitable monohydric linear alcohol useful in preparing the compositions of the invention may be an essentially pure monohydric alcohol having at least about 20 carbon atoms. Preferably, the essentially pure monohydric alcohol is at least about 90 weight percent of a single molecular structure, and more preferably is at least about 95 weight percent of a single molecular structure. Essentially pure monohydric alcohols having 20 to about 26 carbon atoms are well-suited for use in the invention. Preferably, the essentially pure monohydric alcohol has at least about 22 carbon atoms, and more preferably has at least about 24 carbon atoms. The number of carbon atoms of any impurities present in the essentially pure monohydric alcohol is preferably more than about 10, more preferably is more than about 14, and yet more preferably is more than about 18.

Essentially pure monohydric linear alcohols having greater than 20 carbon atoms are available from many sources, including Aldrich Chemical Co., Inc. (Milwaukee, Wis.) and M. Michel and Company, Inc. (New York, N.Y.). A suitable pure monohydric alcohol is behenyl alcohol, commercially available as Cachalot® from M. Michel and Company, Inc. (New York, N.Y.).

Alternatively, the monohydric linear alcohol may be a mixture of monohydric alcohols, so long as the reaction product of dicarboxylic acid and the mixture of monohydric alcohols is a solid, i.e., has a melting point of at least about room temperature. Preferably, at least about 90% of the monohydric alcohols in a mixture of monohydric alcohols has at least about 20 carbon atoms, and more preferably has at least about 24 carbon atoms. The residual 10% impurity in a mixture of monohydric alcohols may have less than 20 carbon atoms, as long as the blend of monohydric alcohols has a hydroxyl value of at least about 60, preferably about 70 to about 180.

Vapor pressure osmometry (VPO), among many other techniques, may be used to characterize the number average molecular weight of a blend of alcohols. The mixture of monohydric alcohols useful in the invention have number average molecular weights by VPO of about 200 to about 800, preferably about 300 to about 600. Pure $C_{22}$ monohydric linear alcohol has a molecular weight of 326 by VPO.

Suitable mixtures of alcohols are commercially available from, e.g., Petrolite Corporation (Tulsa, Okla.) under their UNILIN® trademark.

The monohydric alcohol, whether present as an essentially pure alcohol or in a mixture of monohydric alcohols, has a straight chain alkyl group. Exemplary alcohols useful in the invention include 1-eicosanol ($C_{20}$), 1-docosanol ($C_{22}$, also known as behenyl alcohol), dotriacontanol ($C_{32}$), tetratriacontanol ($C_{34}$), pentatriacontanol ($C_{35}$), tetracontanol ($C_{40}$), tetraacontanol ($C_{44}$), dopentaacontanol ($C_{54}$), tetrahexaacontanol ($C_{64}$), dohexaacontanol ($C_{72}$), etc.

Diamine can be added to the reaction mixture comprising polymerized fatty acid and monohydric alcohol. As used herein, the term diamine refers to an organic molecule having two and only two reactive amine groups. When present, the diamine allows the formation of an amidodiester. However, only a minor amount of diamine should be present in a reaction mixture of polymerized fatty acid and monohydric alcohol, or else the molten viscosity of the resulting amidodiester will be too high. Thus, no more than about 50% of the total reactive equivalents of a mixture of diamine and monohydric alcohol may be contributed by the diamine component.

In other words, if a reaction mixture contains about 2 equivalents of polymerized fatty acid, about x equivalents of monohydric alcohol, and about y equivalents of diamine, and x+y=about 2 so that essentially neutral products are formed, then y is less than about 1. Preferably, y is less than about 0.33, so that only about one third of the equivalents reactive with the polymerized fatty acid come from the diamine component. More preferably, y is less than 0.25, and still more preferably y is equal to zero. When y equals zero, the reaction product contains no amide bonds. While x+y need not exactly equal 2 in the instance where 2 equivalents of diacid are employed in the reaction, it is preferred that the product be essentially neutral, i.e., have an acid number of less than about 20, preferably less than about 10.

The optional diamine component has two and only two reactive amine groups, where those reactive amine groups are preferably primary amine groups. The reactive amine groups are bonded to an organic moiety formed from carbon, hydrogen and optionally oxygen atoms, where the organic moiety has from two to about 36 carbon atoms. Ethylenediamine is an exemplary diamine with two carbon atoms, while dimer diamine is an exemplary diamine with 36 carbon atoms. The carbon backbone of the diamine component may be saturated or unsaturated, e.g., straight chain alkylene as in 1,6-hexanediamine (also known as hexamethylenediamine) and 1,12-dodecanediamine, cyclic alkylene as in isophorone diamine, or aryl as in xylenediamine. JEFFAMINE® diamines, i.e., poly(alkyleneoxy) diamines from Texaco, Inc. (Houston, Tex.), also known as polyether diamines, are exemplary diamines having both carbon and oxygen in the organic moiety to which the amine groups are bonded.

Preferred diamines have from 2 to about 12 carbon atoms, such as 1,6-hexanediamine, ethylene diamine and 1,10-decanediamine.

To prepare the solid diester of the invention, the polymerized fatty acid, monohydric alcohol, and optionally the diamine component, may be combined and the product mixture heated. Any order of combination is suitable, and heating rate is not particularly important. The final heating temperature is suitably about 200° C. to about 250° C. The progress of the reaction may be monitored by taking samples and measuring the acid number and molten viscosity of those samples.

Upon heating, water vapor will be evolved as the esterification, and optionally the amidification reaction occurs. Preferably, the water vapor is condensed and removed from the reaction mixture as soon as it forms, thus driving the reaction to completion. A Dean-Stark trap is suitably used for this purpose. Alternatively, the water vapor is removed by application of a modest vacuum of about 20–200 mtorr.

A catalyst may be used to speed up the esterification or ester/amidification reaction, where suitable catalysts are well known in the art and include sulfuric acid, phosphoric acid and other inorganic acids, metal hydroxides and alkoxides such as tin oxide and titanium isopropoxide, and divalent metal salts such as tin or zinc salts. When a catalyst is present, it should be used in small amounts, e.g., less than about 5 weight percent of the total mass of the reaction mixture, preferably less than about 2% and more preferably less than about 1% of the total mass of the reaction mixture. Excessive amounts of catalyst increase the cost of preparing the diester or amidodiester, as well as often leave behind residue that may be harmful to the environment in which hot-melt ink is placed, e.g., a printhead.

The diester has melting point and molten viscosity properties that render it well suited as a component of a hot-melt ink, and in particular, a jet ink. Thus, the diester is a solid at room temperature, and may have a melting point of about 40° C. to about 150° C., preferably about 50° C. to about 140° C., and more preferably of about 60° C. to about 130° C. The diester further has a melt viscosity of less than about 300 centipoise (cP) at 150° C., preferably less than about 200 cP at 140° C., and more preferably less than about 100 cP at 130° C.

A preferred diester of the invention is at least partially transparent, and thus does not interfere with, taint or mask the appearance of the colorant or other image-forming component in the ink. Furthermore, preferred diesters are hard, are not oily, and are non-tacky.

Another aspect of the invention is a hot-melt ink composition comprising an image-forming component and a diester as described above. The image-forming component is a material that may be detected or observed by any means. A colorant is a preferred image-forming component, where colorants may be visually detected by the human eye, or by an optical character reading device. Both dyes and pigments are suitable colorants, where extensive lists of specific dyes and pigments suitable for use in the hot-melt ink of the present invention are set forth in both of U.S. Pat. Nos. 5,286,288 and 5,122,187, where the disclosures of these two patents are incorporated herein in their entireties.

Alternatively, the image-forming component may be a magnetic material that can be scanned by a suitable reader, or a fluorescent material that can be detected upon exposure to specific wavelengths of light. While in rare instances the carrier itself may serve as an image-forming component, it is more typically the case that the carrier is a transparent material that functions primarily to suspend and disperse the image-forming component at elevated temperatures, and then helps to fix the image-forming component to a substrate after printing.

The carrier typically constitutes about 0.5 to about 97 weight percent of the hot-melt ink composition, and preferably about 80–97 weight percent of the ink composition. The image-forming component typically constitutes about 0.1–3 weight percent, preferably about 0.3–2 weight percent of the hot-melt ink composition.

The hot-melt ink composition of the invention may contain ingredients in addition to colorant and diester. For example, when the hot-melt ink is used in continuous jet ink printing, the ink may contain an electrolyte. When containing an electrolyte, the hot-melt ink may be induced to carry a charge, and droplets of charged hot-melt ink may be directed to either a substrate for printing, or a gutter for recycling, by adjustment of an electrostatic field through which the charged ink particles must pass. A suitable electrolyte for the hot-melt ink composition of the invention is an inorganic salt, as disclosed in, e.g., U.S. Pat. No. 5,286, 288. When the electrolyte is an inorganic salt, an electrolyte-solvating and dissociating compound, as also disclosed in the '288 patent, is preferably present in the hot-melt ink composition.

Other ingredients that may be present in the hot-melt ink composition of the invention include one or more of a corrosion inhibitor, biocide, plasticizer, tackifier, surfactant, dispersing agent, antioxidant, rheology modifier and UV stabilizer.

Hot-melt ink compositions of the present invention may generally be prepared simply by combining the desired ingredients to form a mixture, and heating the mixture with stirring to form a molten homogeneous composition which is the hot-melt ink composition. A temperature in the range of about 90° C. to about 150° C. is typically adequate to achieve a homogeneous composition after a stirring time of about 5 seconds to about 10 minutes. It is also possible to melt one component of the ink, e.g., the carrier, and then add other components with stirring. When pigment is included in the hot-melt ink composition, then it may be necessary to grind the mixture of ingredients to effect a uniform dispersion of the pigment in the ink. Grinding may suitably be accomplished with a ball mill or an atritor.

As used herein, the term "hot-melt ink" denotes an ink that is a solid at room temperature and a liquid at the operating temperature of the printer employing the hot-melt ink. Typical printers for hot-melt inks heat the ink to about 110° C. to about 130° C. The hot-melt ink of the invention thus has a viscosity of about 1 centipoise (cP) to about 50 cP at a temperature of about 75° C. to about 175° C., more preferably has a viscosity of about 2 cP to about 20 cP at a temperature of about 90° C. to about 150° C., and still more preferably has a viscosity of about 5 cP to about 15 cP at a temperature of about 110° C. to about 130° C.

The hot-melt ink of the invention may be used to print on a wide variety of substrates, which may be porous or non-porous. Exemplary substrates include plastics, plastic laminates, glass, metal, paper, wood, etc. The ink may be used in drop-on-demand and continuous ink jet printers, where these printers are commercially available from many sources.

The hot-melt ink may also be used in gravure and intaglio printing. To achieve such printing with a hot-melt ink, a hot-melt ink as described above is melted and the molten ink stored in a reservoir. A printing plate, which is typically warmed to a temperature of greater than or about the same as the melting point of the hot-melt ink, is then contacted with the pool of molten hot-melt ink. In this way, molten hot-melt ink is transferred to a gravure or intaglio printing plate, in essentially the same manner as liquid inks are currently transferred to a printing plate.

The printing plate, having molten hot-melt ink thereon, is then contacted with a substrate in order to transfer ink to the substrate in an image-wise fashion. The substrate, which is typically at room temperature, will immediately induce cooling of the hot-melt ink, and thereby cause the ink to become fixed to the substrate.

The following examples are set forth as a means of illustrating the present invention and are not to be construed as a limitation thereon.

EXAMPLE 1

Preparation of Di($C_{38}$)alkyl Dimerate

Heating 21.4 g EMPOL® 1008 dimer acid (Henkel Corp., Emery Group, Cincinnati, Ohio, ca. 72 meq acid groups) and 50.7 g UNILIN® 550 alcohol (Petrolite Corporation, Polymers Division, Tulsa, Okla., a mixture of alcohols having a vapor pressure osmometry (VPO) number-average MW of 550 and an estimated functional purity of 85% and a hydroxyl value of 76; 69 meq hydroxyl) to 220°–225° C. and holding for 3 hours yielded a hard, brittle, off-white, tack-free, nearly opaque solid having a softening point of 99° C. and a viscosity at 130° C. of 21 cP.

EXAMPLE 2

Preparation of Di($C_{38}$)alkyl Dimerate Modified with 1,6-Hexanediamine

Heating 53.1 g EMPOL® 1008 dimer acid (ca. 180 meq acid) and 94.2 g UNILIN® 550 alcohol (128 meq hydroxyl), and 2.7 g 1,6-hexanediamine (also called hexamethylenediamine, HMDA, Aldrich Chemical, Milwaukee, Wis., 46 meq amine) to 220°–225° C. and holding for 3 hours yielded a hard, brittle, tan, tack-free, translucent solid having a softening point of 103° C. and a viscosity at 130° C. of 28 cP.

EXAMPLE 3

Preparation of Di($C_{26}$)alkyl Dimerate Modified with 1,6-Hexanediamine

Heating 29.5 g EMPOL® 1008 dimer acid (ca. 104 meq acid) and 22.5 g UNILIN® 350 alcohol (a mixture of alcohols having a vapor pressure osmometry (VPO) number-average MW of 375 and an estimated functional purity of 85% and a hydroxyl value of 129; 52 meq hydroxyl), and 3.0 g HMDA (52 meq amine) to 220°–225° C. and holding for 3 hours yielded a slightly soft, flexible, tan, tack-free, translucent solid having an acid number of <9, a softening point of 77° C. and a viscosity at 130° C. of 45 cP.

EXAMPLE 4

Heating 28.3 g EMPOL® 1008 dimer acid (ca. 96 meq acid) and 19.4 g Cachalot BE (1-docosanol, M. Michel and Company, New York, N.Y., 58 meq.), and 2.3 g HMDA (38 meq amine) to 220°–225° C. and holding for 3 hours yielded a translucent, hard solid having a softening point of 73° C. and a viscosity at 130° C. of 33 cP.

COMPARATIVE EXAMPLE 1

A mixture of stearyl alcohol (Aldrich Chemical Co., Milwaukee, Wis., 15.02 g, 56 meg hydroxyl), dimer acid (EMPOL® 1008, 31.76 g, 112 meq acid) and HMDA (3.23 g, 56 meq amine) was heated to 223°–228° C. for 3 hours under a gentle sweep of nitrogen. The product, cooled to room temperature, was a clear, nearly colorless, soft solid with a greasy feel, a softening point of 75° C. and a viscosity of 53 cP at 130° C. These physical properties render the material unsuitable for use in a jet-ink because it is too soft to have adequate rub resistance, too greasy to have adequate adhesion, and too hard to wet surfaces like films.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A solid diester prepared by reacting about 2 equivalents of liquid polymerized fatty acid with about x equivalents of $C_{20+}$ monohydric linear primary alcohol and about y equivalents of diamine, where x+y is equal to about 2 and y is 0 to about 1.

2. The diester of claim 1 having a melting point of about 40° C. to about 150° C.

3. The diester of claim 1 having a melting point of about 60° C. to about 130° C.

4. The diester of claim 1 having a viscosity of less than about 300 cP at 150° C.

5. The diester of claim 1 having a viscosity of less than about 100 cP at 130° C.

6. The diester of claim 1 having an acid number of less than about 20.

7. The diester of claim 1 wherein the polymerized fatty acid has an acid number of about 180 to about 200.

8. The diester of claim 1 wherein the polymerized fatty acid is hydrogenated polymerized fatty acid.

9. The diester of claim 1 wherein the polymerized fatty acid contains less than about 10 weight percent trimer acid and greater than about 90 weight percent dimer acid.

10. The diester of claim 1 wherein the diamine has the formula $H_2N-R-NH_2$, wherein R is selected from $C_2$ to about $C_{36}$ hydrocarbon and $C_2$ to about $C_{36}$ poly(alkyleneoxy).

11. The diester of claim 1 wherein the diamine is selected from the group consisting of ethylene diamine, 1,6-hexanediamine and 1,10-decanediamine.

12. The diester of claim 1 wherein the monohydric alcohol has 20 to about 26 carbon atoms.

13. The diester of claim 1 wherein the monohydric alcohol is a blend of monohydric alcohols, where the blend has a hydroxyl number of about 60 to about 180.

14. The diester of claim 13 wherein the blend has a hydroxyl number of about 70 to 130.

15. The diester of claim 1 wherein y is less than about 0.33.

16. The diester of claim 1 wherein y is zero.

17. A hot-melt ink composition comprising an image-forming component and a diester according to claim 1.

18. The hot-melt ink composition of claim 17 wherein the image-forming component is a colorant.

19. The hot-melt ink composition of claim 17 having a viscosity of about 1 cP to about 50 cP at a temperature of about 75° C. to about 175° C.

20. The hot-melt ink composition of claim 17 having a viscosity of about 5 cP to about 15 cP at a temperature of about 110° C. to about 130° C.

21. A method of printing comprising the steps of mixing an image-forming component with a diester of claim 1 to prepare a hot-melt ink, storing said hot-melt ink in a molten state within a printhead designed for hot-melt printing, and ejecting molten hot-melt ink from said printhead onto a substrate.

22. A method of printing comprising the steps of mixing an image-forming component with a diester of claim 1 to prepare a hot-melt ink, melting the hot-melt ink to prepare molten ink, contacting a gravure or intaglio printing plate with the molten ink to provide a printing plate having molten ink thereon, and then contacting the printing plate having molten ink thereon with a substrate to transfer an image from the printing plate to the substrate.

23. A process for preparing a solid diester comprising reacting about 2 equivalents of liquid polymerized fatty acid with about x equivalents of $C_{20+}$ monohydric linear primary alcohol and about y equivalents of diamine, where x+y is equal to about 2 and y is 0 to about 1.

24. The process of claim 23 wherein y is 0.

25. The process of claim 23 wherein the diamine has the formula $H_2N$—R—$NH_2$, wherein R is selected from $C_2$ to about $C_{36}$ hydrocarbon and $C_2$ to about $C_{36}$ poly (alkyleneoxy), and the monohydric alcohol has 20 to about 26 carbon atoms.

* * * * *